United States Patent [19]

Paramythioti

[11] 4,028,946

[45] June 14, 1977

[54] CONTROL LEVER ASSEMBLY

[75] Inventor: Michel Paramythioti, Chantilly, France

[73] Assignee: Albaret S.A., France

[22] Filed: Feb. 18, 1976

[21] Appl. No.: 659,030

[30] Foreign Application Priority Data

Feb. 20, 1975 France ............................ 75.05245

[52] U.S. Cl. ..................................... 74/522; 74/516
[51] Int. Cl.[2] ...................... G05G 1/04; G05G 7/04
[58] Field of Search ............ 74/491, 519, 522, 523, 74/525, 516, 517, 518

[56] References Cited

UNITED STATES PATENTS

| | | | |
|---|---|---|---|
| 2,076,047 | 4/1937 | Scott | 74/516 X |
| 2,199,095 | 4/1940 | Banker | 74/516 X |
| 3,330,477 | 7/1967 | Stephens | 74/516 X |
| 3,693,474 | 9/1972 | Trick | 74/522 |

*Primary Examiner*—Allan D. Hermann
*Attorney, Agent, or Firm*—Diller, Brown, Ramik & Wight

[57] ABSTRACT

A control lever assembly for controlled reciprocation of an operating member which may be a Bowden cable for regulating the flow rate of a pump supplying a hydraulic motor in a hydrostatic transmission. In addition to the usual pivotally mounted control lever, an intermediate lever is pivotally connected between the control lever and the operating member. The intermediate lever is received in a sleeve member which is pivotally mounted about a fixed axis spaced from the fixed axis about which the control lever pivots. The sensitivity of the control lever assembly is thus made smoother and more gradual proximate to the neutral or dead center position of the assembly.

9 Claims, 4 Drawing Figures

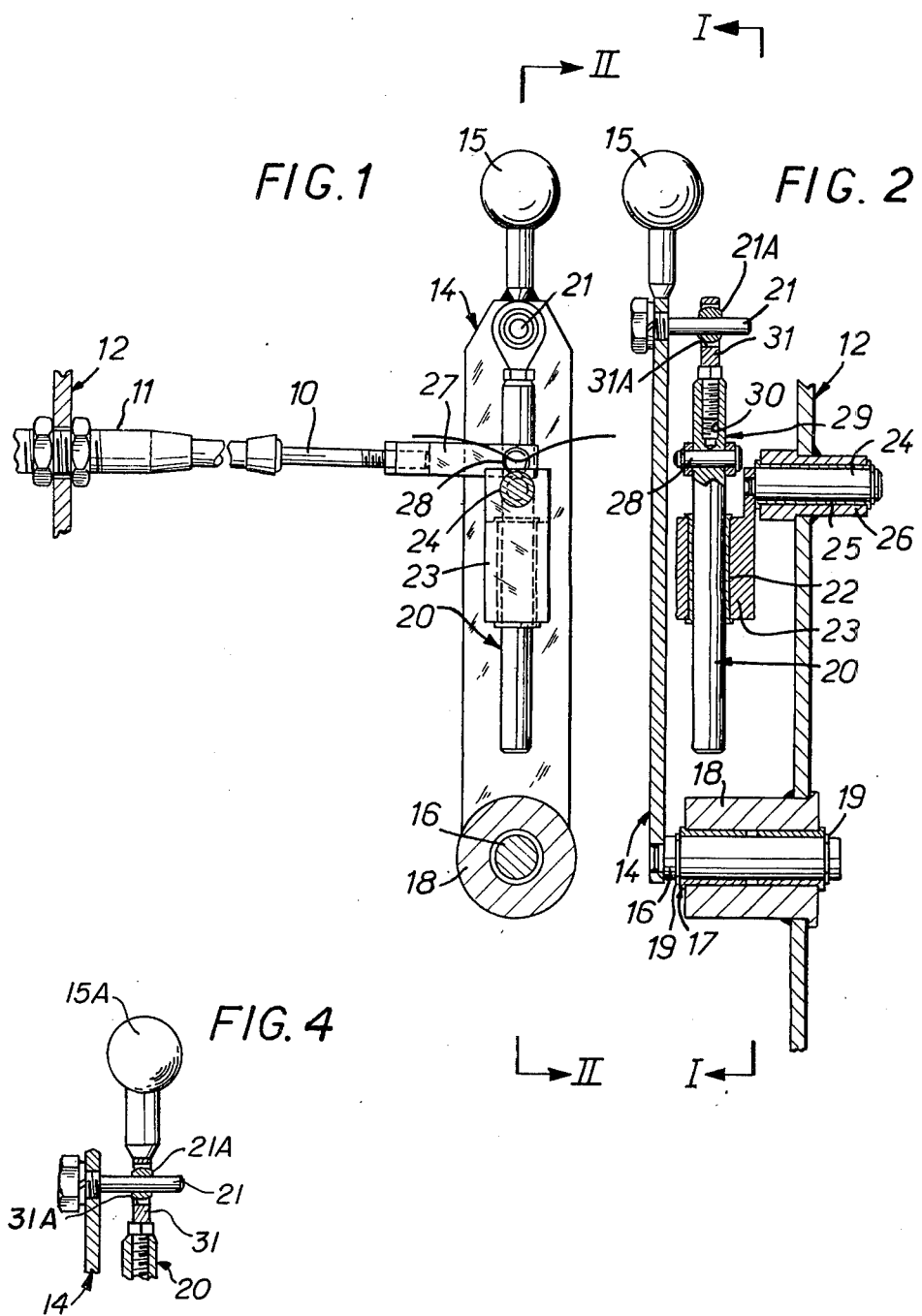

CONTROL LEVER ASSEMBLY

The present invention relates generally to lever controls of the type comprising a controlled member attached to a pivotally mounted control lever, and more particularly to such lever controls which are adapted to hydrostatic transmission vehicles, such as certain road surface compacting machines.

By the term hydrostatic transmission I intend a transmission assembly comprising at least a high pressure flow pump, the flow rate of the pump being adjustable about a zero point by means of a controlled operating member and at least a hydraulic motor supplied by said pump, the speed of the motor being controlled by regulating the flow rate of the pump supplying it.

In practice the controlled operating member of the pump is usually a push-pull member connected by suitable linkage or other equivalent connecting means to a control lever within the reach of the driver of the vehicle or machine provided with such hydrostatic transmission.

For one's driving convenience, it is desirable that acceleration and deceleration of such vehicles or machines may be controlled as gradually as possible.

Now, the usual lever controls for such vehicles or machines act more abruptly when the control lever is in the vicinity of its dead center or neutral position corresponding to the stopping of the particular machine or vehicle; this is caused by the fact that the path of movement of the controlled operating member attached to the pivoted control lever is proportional to the sine of the pivoted angle of the control lever with respect to its dead center or neutral position and by the fact that the sine varies more abruptly as its value approaches zero.

Usual lever controls therefore are not of a nature capable of satisfying the desideratum of driving ease as briefly set forth above.

An object of the present invention is a control lever assembly which, contrary to known lever controls, satisfies in a simple and efficent manner such desiderata.

The control lever assembly according to the present invention is of the type comprising a controlled operating member attached to a pivotally mounted control lever, wherein the improvement comprises an intermediate or auxiliary lever interposed between said control lever and said controlled operating member, said intermediate lever being pivotally connected to said control lever and slidably mounted in a sleeve member, said sleeve member being pivotally mounted about a fixed pivot spaced from the control lever pivot, said controlled operating member also being pivotally connected to said intermediate lever.

When the control lever is displaced from its dead center it draws with it the intermediate lever, and therefore the controlled operating member, the displacement of the controlled operating member is effectively geared down due to the fact that the intermediate lever is both pivotally connected to the control lever which draws it and slidably mounted in a sleeve member pivotally mounted about a fixed pivot so that in the vicinity of the neutral or dead center position the path of movement of the controlled operating member is substantially reduced compared to what it would be had the controlled operating member been attached directly to the control lever.

In practice, by an appropriate selection of parameters, the effective lever arm drawing or pulling the controlled operating member, i.e., the distance between the pivotal connection of the controlled operating lever to the controlled operating member and the fixed pivot of the sleeve member may, at rest, be as small as desired, even nil, this lever arm then progressively increasing in proportion to the angular pivotal movement of the control lever.

It follows that the lever control according to the invention admits of a great flexibility of control.

The object of the invention, other features and advantages will be brought out in the description which follow, by way of example, with reference to the acompanying drawings which follow in which:

FIG. 1 is a sectional view of a present control lever assembly taken along the line I—I in FIG. 2, in the dead center or neutral position of the control lever;

FIG. 2 is a side view of the control lever assembly in section taken along the line II—II in FIG. 1.

FIG. 4 is a fragmentary side view corresponding to the upper portion of FIG. 2, but wherein the handle is on the intermediate lever.

Figure 3:
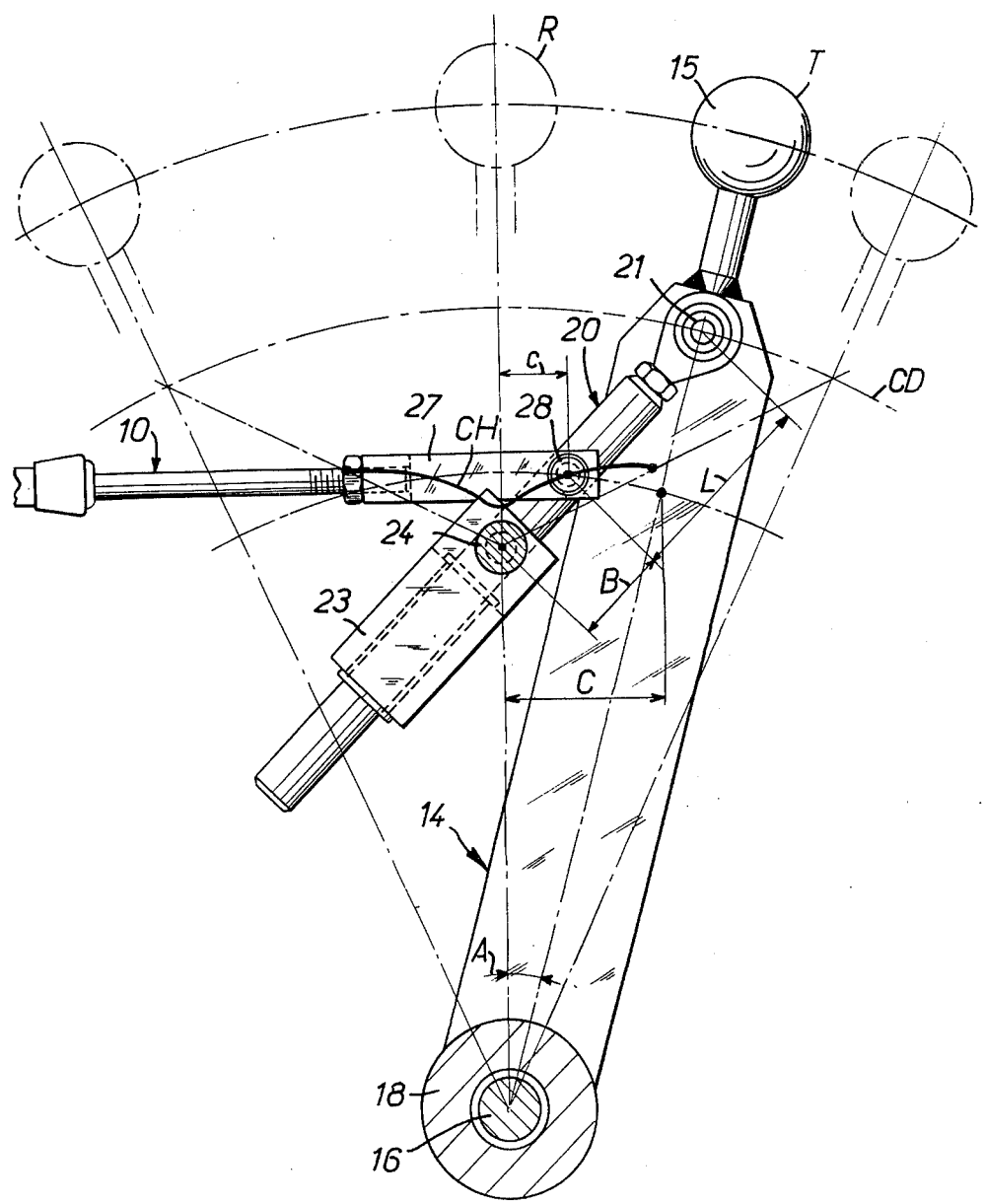
FIG. 3 is a view on an enlarged scale of part of FIG. 1 for various operating positions of the present control lever assembly.

The figures illustrate the application of the invention to the push-pull or reciprocating control of a cable 10 freely axially mounted in a sheath 11 which is fixed at each end to a frame 12; such a push-pull cable arrangement is a Bowden cable capable of two-way control.

Such a cable 10 may, for example, be used for controlling the push-pull slide member regulating the flow rate of a variable flow pump supplying a hydraulic motor as is usually the case in hydrostatic transmissions (not shown in the drawings).

The lever control assembly provided in the illustrated embodiment for the control of the push-pull cable 10 comprises a control lever 14 pivotally mounted at one end on the frame 12 and provided at its other end with a knob 15 for facilitating the manoeuver of the control lever.

In the illustrated example the control lever 14 is pivotally mounted about a pivot pin 16 which is freely received in a double-flanged bushing 17 inside a sleeve 18 fixed to the frame member 10, e.g., by welds, as shown; resilient retaining rings 19 are provided on the pivot pin 16 immediately beyond each flanged end of the bushing 17.

An intermediate or auxiliary lever 20 is pivotally connected to the control lever 14 by means of a pivot pin 21 proximate to the knob 15 on the control lever and a ball member 21A which receives the pivot pin 21, the ball member being received in a corresponding socket member 31A for completing the pivotal connection.

Remote from the pivot pin 21 the intermediate lever is received for sliding movement inside a double-flanged bushing 22 inside a sleeve member 23 which in turn is pivotally mounted about a fixed pintle spaced from the pivot pin 16 of the control lever 14.

In practice, and as shown, the sleeve member 23 is provided with a pintle 24 disposed perpendicular to its general axis with a double-flanged bushing 25 recieved thereabout which is in turn received inside another sleeve member 26 fixed to the frame member 12 by welds.

Preferably, and as illustrated, a resilient retaining ring is provided at the free end of the pintle 24 for abutment against the corresponding flanged end of the bushing 25.

The cable 10 is attached to the intermediate lever 20. In practice the attachment of the cable to the auxiliary lever 20 is effected by means of a yoke or U-shaped connecting member 27 pivotally mounted on a pivot pin 28.

In the illustrated embodiment the axis of the pivot pin 28 is generally disposed between the axis of the pintle 24 of the sleeve member 23 in which the intermediate lever 20 is slidably mounted and the axis of the pivot pin 21 pivotally connecting the intermediate lever 20 to the control lever 14.

Preferably, and as shown, the portions of the intermediate lever 20 disposed between the axis of the pivot pin 21 by which it is pivotally connected to the control lever 14 and the axis of the pintle 28, by which the yoke or U-shaped connecting member 27 is pivotally connected, is adjustable in length.

For example, and as illustrated, the intermediate lever 20 comprises a cylindrical rod 29 which bears the pivot pin 28 for the yoke or generally U-shaped connecting member has an axially tapped bore at one end in which a ring head 31 is threadedly received, the ring head defining interiorly the socket member 31A cooperating with ball member 21A.

It shall be assumed, as illustrated in FIG. 3, that measuring from the dead center position R in dash-dotted lines in the figure, the control lever 14 is displaced through an angle A until it attains the operating position T shown in solid lines in the same figure.

As the control lever 14 is pivoted or displaced angularly, the intermediate lever 20 is drawn therewith, pivoted about the pivotal connection between the two levers while causing the sleeve member 23 to pivot about its pintle 24 so as to enable the intermediate lever to slide slightly outwardly of the sleeve member 23. The effect of the corresponding displacement of the intermediate lever 20 is to pull on the cable 10.

Referring, for the purpose of illustrating this point, to the pivot 28 attaching the intermediate lever 20 and to the cable 10 by the yoke or U-shaped connecting member 27, it is noted that the displacement of the cable 10, taken along the axis of the pivot pin 28, during the angular displacement A of the control lever 14, is $c$ whereas the same displacement when the pivot pin 28 is directly connected to the control lever 14, as is usually the case, would be C. The radii of the angular displacement about the pivot pin 15 of the control lever 14 being, all things being equal, the same in both cases. It will be immediately recognized that the travel C is much greater than the travel $c$.

In practice the axis of the pivot pin 28, or more specifically the path of movement of this pivot pin in the plane of FIG. 3, described a conchoid CH of a circle CD, shown in the plane of FIG. 3 and described by the axis of pivot pin 21 the focus of which is the pintle 24 of the sleeve member 23. The conchoid is derived from the circle CD by subtracting a constant length L along the secant which coincides with the axis of the intermediate lever 20.

Since the corresponding length of the intermediate lever 20 is advantageously adjustable in length, as described above, it is possible assign the length L any desired value.

In particular the axes of the pivot pin 28 and pintle 24 may, in the dead center position of the assembly, coincide in the plane of FIG. 3. In this case the displacement of the cable 10 is practically nil in the immediate vicinity of the dead center position R of the control lever 14, the corresponding conchoid having an inflection point there.

In the same case the effective lever arm B, i.e., the distance between the axes of the pintle 24 and the pivot pin 28, is nil for the dead center position; thereafter it increases gradually in proportion to the degree of protrusion of the intermediate lever 20 beyond the sleeve member 23 as explained above.

The present invention is of course not limited to the particular embodiment described and illustrated herein but applies to all modifications falling within the scope of the appended claims.

In particular, in the above assembly the point of the pivotal connection of the controlled operating member to the intermediate auxiliary lever is intermediate the pintle of the sleeve member in which the intermediate lever is slidably mounted and the point at which the control lever is pivotally connected to the intermediate lever which corresponds advantageously to the natural movement it is necessary to apply force to the control lever for pushing or pulling the controlled operating member; however, this is not necessarily the case, the control member might on the contrary for certain special applications be attached to the intermediate lever beyond its associated sleeve member and its pivotal connection with the control lever.

Moreover, the intermediate lever 20, rather than the control lever 14, may be equipped with the handle or grip as identified by the reference numeral 15A in FIG. 4.

Furthermore, between the control lever and the intermediate lever there may be provided releasable securing means temporarily fixing the levers relative to each other in their dead center position for producing more sensitive control of the dead center position.

Finally, the present application is not limited to lever controls for hydrostatic transmission vehicles but concerns all lever controls irrespective of their field of application.

What I claim is:

1. A control lever assembly for controlled reciprocation of an operating member, comprising a control lever pivotally mounted about a first fixed pivot, an intermediate lever, first pivot means pivotally connecting said intermediate lever to said control lever, second pivot means pivotally connecting said operating member to said intermediate lever, a sleeve member pivotally mounted about a second fixed pivot spaced from the first fixed pivot, said intermediate lever being received for relative sliding movement in said sleeve member.

2. A control lever assembly according to claim 1, further comprising means for adjusting the length of said intermediate lever included between said first and second pivot means.

3. A control lever assembly according to claim 1, wherein said second pivot means is disposed generally between second fixed pivot and said first pivot means, as viewed perpendicular to the general plane of displacement of said control lever assembly.

4. A control lever assembly according to claim 1, wherein said control lever assembly has a dead center position in which the axis of said second pivot means is coincident with the axis of the second fixed pivot.

5. A control lever assembly according to claim 1, wherein handle means is disposed on one of said levers.

6. A control lever assembly according to claim 1, wherein handle means is disposed on said control lever.

7. A control lever assembly according to claim 1, wherein handle means is disposed on said intermediate lever.

8. A control lever assembly according to claim 1, wherein said intermediate lever is formed as a rod-like member with a head portion in threaded engagement therewith, said head portion being part of said first pivot means.

9. A control lever assembly according to claim 8, wherein said first pivot means includes a ball joint.

* * * * *